US012565276B2

(12) United States Patent　　　　　(10) Patent No.:　US 12,565,276 B2
Bando et al.　　　　　　　　　　　　(45) Date of Patent:　　Mar. 3, 2026

(54) STEP DEVICE AND STRADDLE TYPE VEHICLE

(71) Applicant: HONDA MOTOR CO., LTD., Tokyo (JP)

(72) Inventors: Kenta Bando, Tokyo (JP); Hiroyuki Komura, Tokyo (JP); Hikaru Hirashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 442 days.

(21) Appl. No.: 18/120,735

(22) Filed: Mar. 13, 2023

(65) Prior Publication Data

US 2023/0312039 A1　　　Oct. 5, 2023

(30) Foreign Application Priority Data

Mar. 31, 2022　　(JP) ................................. 2022-060667

(51) Int. Cl.
*B62J 25/00*　　　　　(2020.01)
(52) U.S. Cl.
CPC ..................................... *B62J 25/00* (2013.01)
(58) Field of Classification Search
CPC ....................................................... B62J 25/06
USPC ......................................................... 280/291
See application file for complete search history.

(56) References Cited

U.S. PATENT DOCUMENTS

| | | | | |
|---|---|---|---|---|
| 9,540,066 | B1 * | 1/2017 | Bloomer ................. | B62J 25/04 |
| 2009/0108560 | A1 | 4/2009 | Mountz et al. | |
| 2022/0281548 | A1 * | 9/2022 | Kaeb ....................... | B62J 25/06 |

FOREIGN PATENT DOCUMENTS

| | | |
|---|---|---|
| CN | 102476676 A | 5/2012 |
| JP | S5841686 U | 3/1983 |
| JP | H05-208691 A | 8/1993 |
| JP | H06-55987 U | 8/1994 |
| JP | 2008-062720 A | 3/2008 |
| JP | 2008-230525 A | 10/2008 |
| JP | 2011005954 A * | 1/2011 |
| JP | 2018-158659 A | 10/2018 |

OTHER PUBLICATIONS

German Office Action for German Patent Application No. 10 2023 107 005.3 mailed on May 22, 2025.
Japanese Office Action for Japanese Patent Application No. 2022060667 mailed Jan. 22, 2024 (partially translated).

* cited by examiner

*Primary Examiner* — Valentin Neacsu
*Assistant Examiner* — Hosam Shabara
(74) *Attorney, Agent, or Firm* — THOMAS | HORSTEMEYER, LLP

(57)　　　　　　　　　ABSTRACT

The present invention provides a step device (16) provided in a straddle type vehicle (10), comprising: a step (20) for an occupant of the straddle type vehicle (10) to put a foot on; and a holder (30) including a bracket (31) to which the step (20) is attached, wherein the bracket (31) includes two support portions (32) extending to sandwich the step (20) and rotatably supporting the step (20), and a base portion (33) connecting the two support portions (32), and wherein the holder (30) includes a protruding portion (36) protruding toward the step (20) side more than the base portion (33) to abut the step (20).

10 Claims, 5 Drawing Sheets

F I G.  4
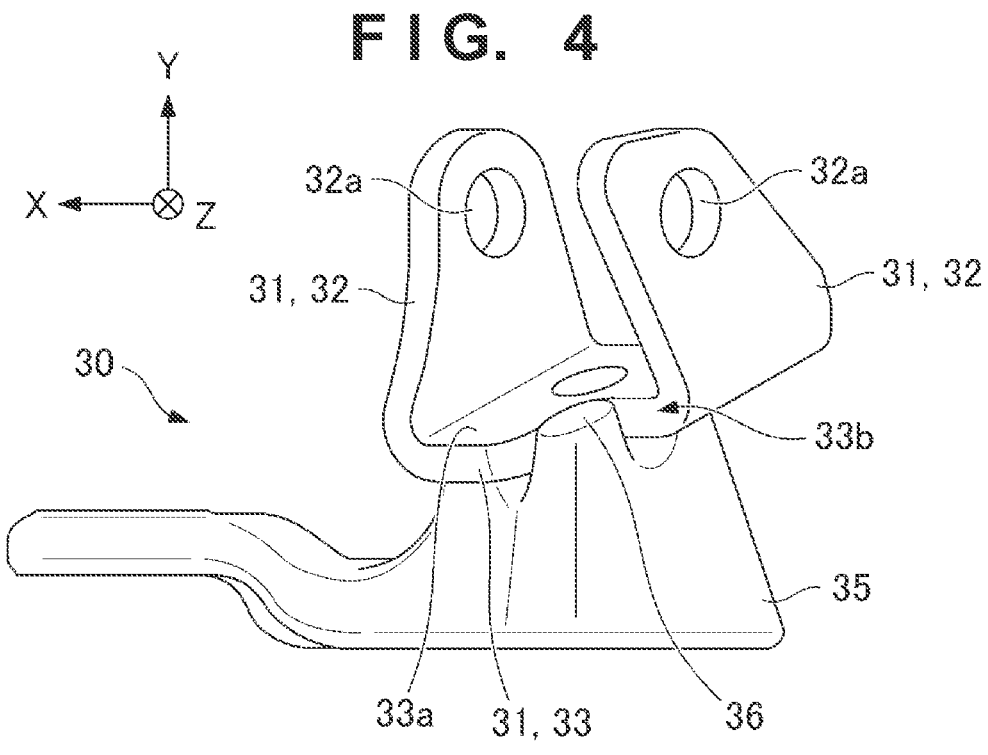
F I G.  5
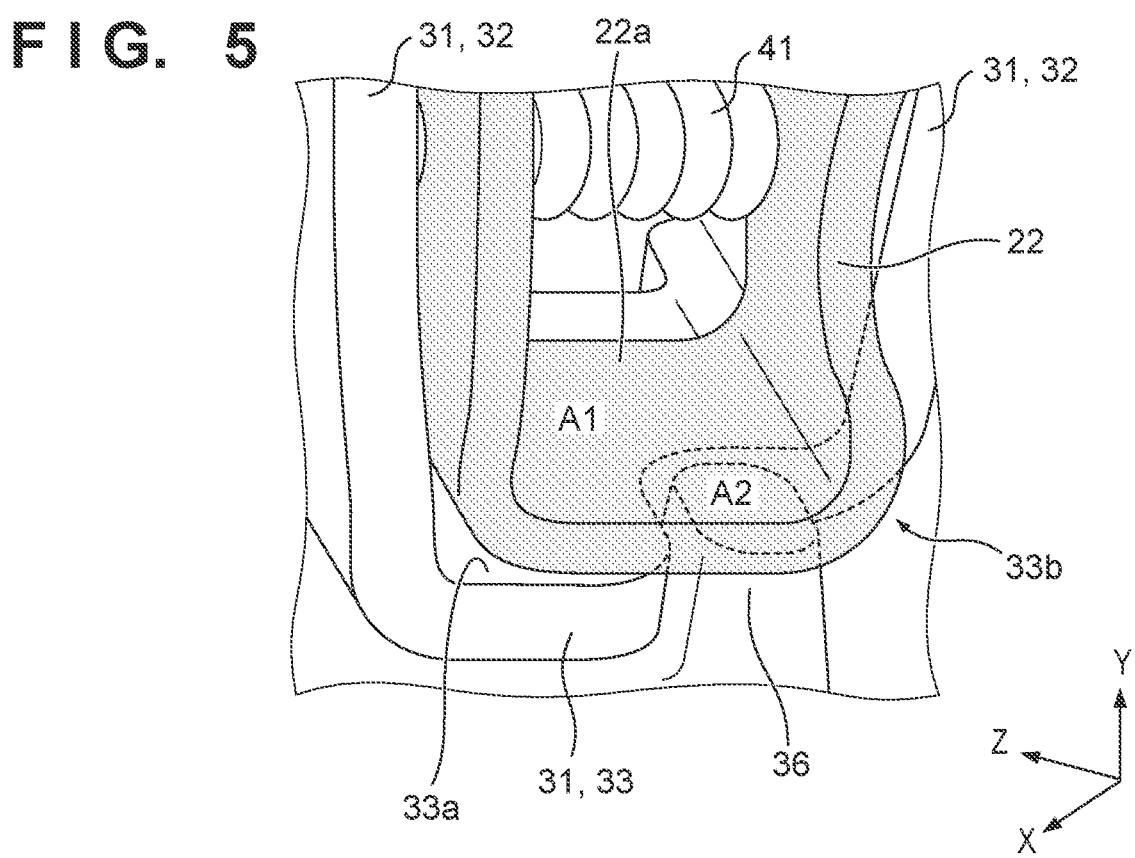

STEP DEVICE AND STRADDLE TYPE VEHICLE

CROSS-REFERENCE TO RELATED APPLICATION(S)

This application claims priority to and the benefit of Japanese Patent Application No. 2022-060667 filed on Mar. 31, 2022, the entire disclosure of which is incorporated herein by reference.

BACKGROUND OF THE INVENTION

Field of the Invention

The present invention relates to a step device and straddle type vehicle.

Description of the Related Art

Japanese Patent Laid-Open No. 2018-158659 describes a straddle type vehicle having a step for a driver seated on a seat to place a foot on and a step bracket to which the step is attached. The step bracket is attached to a vehicle body frame of the straddle type vehicle.

In the straddle type vehicle, in order to improve how it feels to ride the vehicle, it is desired to reduce the vibration of the step in which the occupant such as the driver puts the foot on.

SUMMARY OF THE INVENTION

The present invention provides, for example, a technology capable of reducing vibration of a step of a straddle type vehicle and improving how it feels to ride the vehicle.

According to one aspect of the present invention, there is provided a step device (16) provided in a straddle type vehicle (10), comprising: a step (20) for an occupant of the straddle type vehicle (10) to put a foot on; and a holder (30) including a bracket (31) to which the step (20) is attached, wherein the bracket (31) includes two support portions (32) extending to sandwich the step (20) and rotatably supporting the step (20), and a base portion (33) connecting the two support portions (32), and wherein the holder (30) includes a protruding portion (36) protruding toward the step (20) side more than the base portion (33) to abut the step (20).

Further features of the present invention will become apparent from the following description of exemplary embodiments with reference to the attached drawings.

BRIEF DESCRIPTION OF THE DRAWINGS

FIG. 4 is a diagram illustrating a configuration example of a holder of the step device according to the present invention;

FIG. 5 is an enlarged view of the vicinity of a base portion of the holder in the step device according to the present invention.

DESCRIPTION OF THE EMBODIMENTS

Figure 1:
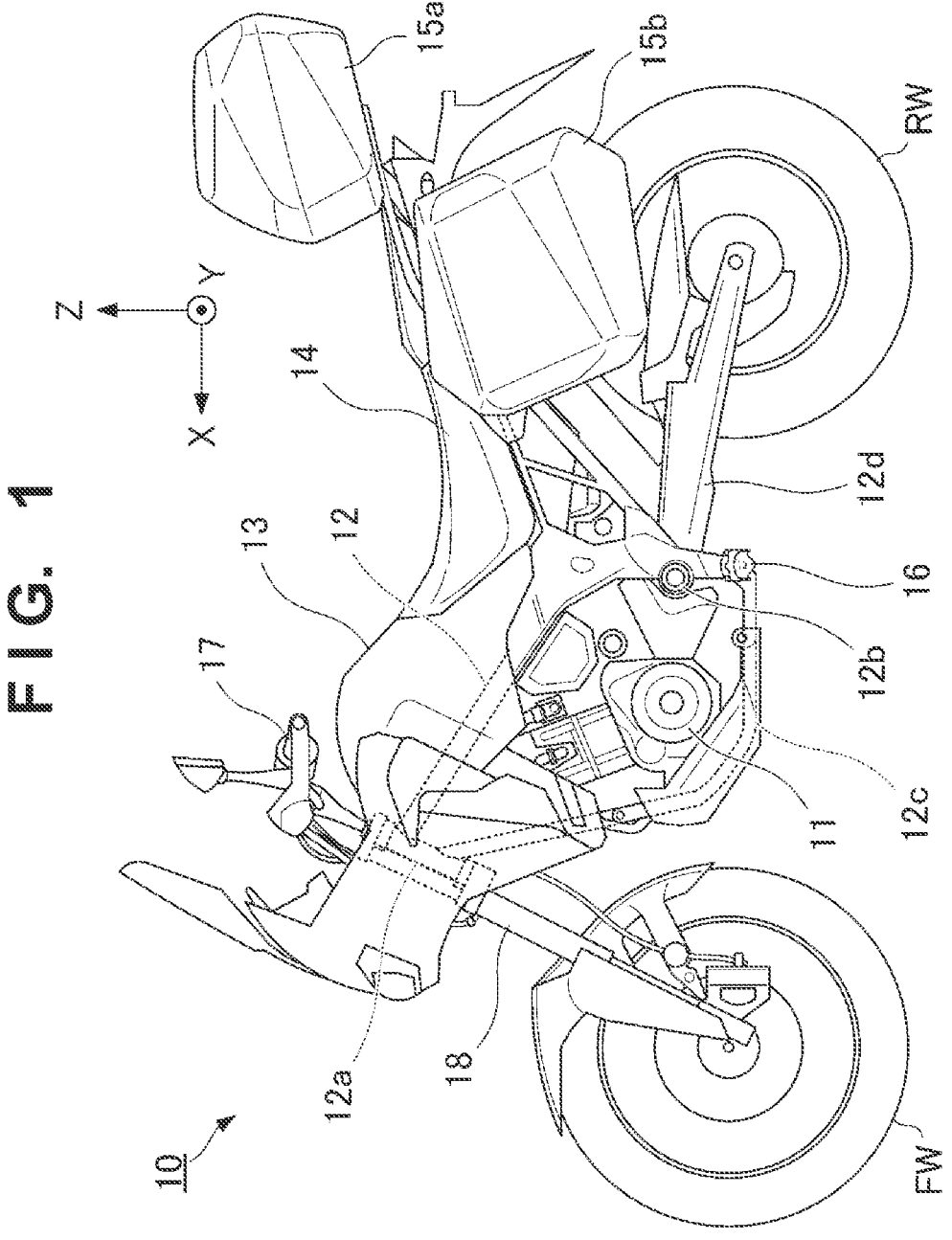
FIG. 1 is a left side view of the left side of a straddle type vehicle.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of Straddle Type Vehicle

FIG. 1 is a left side view of a straddle type vehicle 10 according to an embodiment of the present invention. In FIG. 1, arrows X, Y, and Z indicate directions orthogonal to one another. An X direction indicates a front-and-rear direction of the straddle type vehicle 10, a Y direction indicates a vehicle width direction (left-and-right direction) of the straddle type vehicle 10, and a Z direction indicates an up-and-down direction of the straddle type vehicle 10. Hereinafter, an example in which a step device 16 according to the present invention is applied to a motorcycle as the straddle type vehicle 10 will be described, but the present invention is not limited thereto, and is also applicable to other types of straddle type vehicles such as a three-wheeled vehicle. In addition, the step device 16 according to the present invention is also applicable to an electric vehicle using a motor as a drive source in addition to a vehicle using an internal combustion engine as a drive source.

The straddle type vehicle 10 includes a power unit 11 between a front wheel FW and a rear wheel RW. The power unit 11 includes, for example, an engine and a transmission, and is supported by a vehicle body frame 12. A driving force of the power unit 11 is transmitted to the rear wheel RW via an unillustrated drive shaft to rotate the rear wheel RW. On an upper portion of the vehicle body frame 12, a fuel tank 13 is disposed. Further, a seat 14 on which a driver sits and a rear trunk 15a are provided behind the fuel tank 13. In addition, a step device 16 for the driver to put a foot on in the state of being seated on the seat 14 is attached to the vehicle body frame 12. Note that a specific configuration example of the step device 16 of the present embodiment will be described later.

A front end portion of the vehicle body frame 12 rotatably supports a handle 17 to be gripped by the driver to steer the straddle type vehicle 10. The handle 17 is connected to a front fork 18 that rotatably supports the front wheel FW via a steering shaft. The steering shaft is pivotally supported by a head pipe 12a provided at a front end portion of the vehicle body frame 12. In addition, at a rear end portion of the vehicle body frame 12, a pair of left and right pivot plates 12b are provided. Lower end portions of the pivot plates 12b and the front end portion of the vehicle body frame 12 are connected by a pair of left and right lower arms 12c, and the power unit 11 is supported by the vehicle body frame 12 and the lower arms 12c. A front end portion of a rear swing arm 12d extending in the front-and-rear direction is swingably supported by the pivot plates 12b. The rear swing arm 12d is swingable in the up-and-down direction, and the rear wheel RW is supported at a rear end portion thereof. A muffler (not illustrated) that reduces exhaust sound when exhaust is performed from the power unit 11 is extended on a side of the rear wheel RW. Left and right saddle backs 15*b* are provided on an upper lateral sides of the rear wheel RW.

Configuration of Step Device

Figure 2:
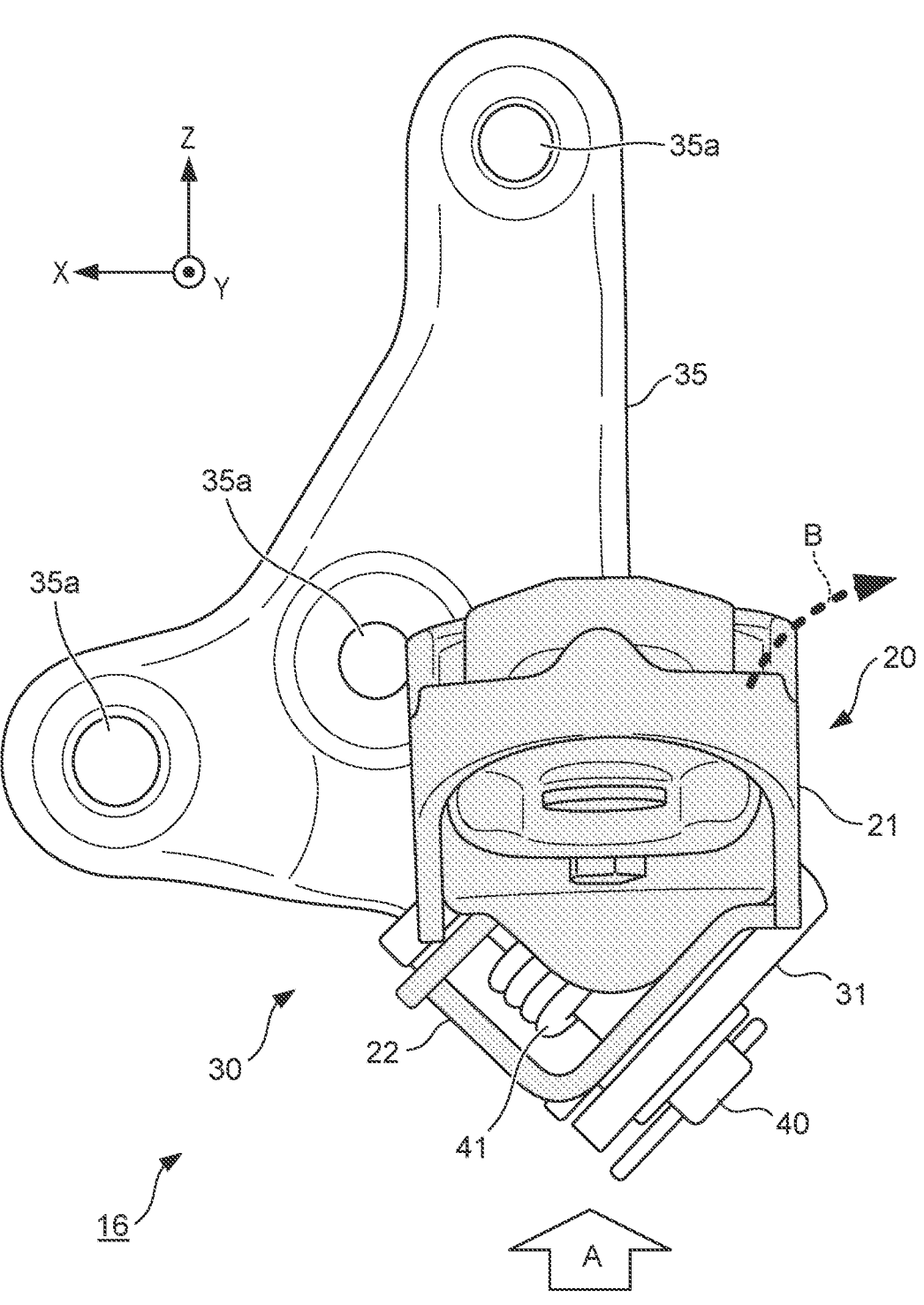
FIG. 2 is a diagram illustrating a configuration example of a step device according to the present invention (diagram viewed from the left side of the vehicle)
Figure 3:
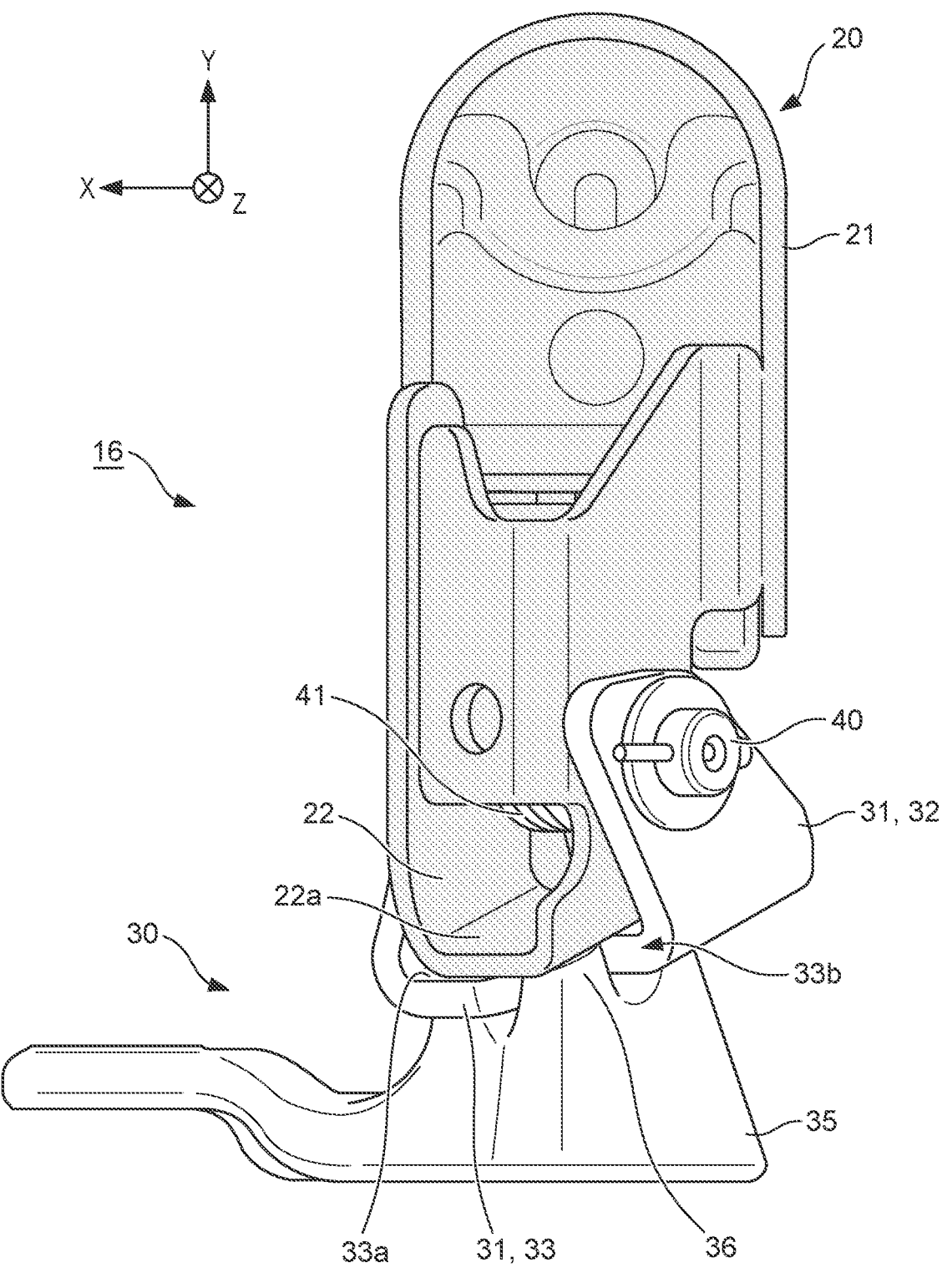
FIG. 3 is a diagram illustrating a configuration example of a step device according to the present invention (diagram viewed from the lower side of the vehicle)

Hereinafter, a configuration example of the step device 16 will be described with reference to FIGS. 2 to 4. FIGS. 2 to 3 are diagrams illustrating a configuration example of the step device 16 of the straddle type vehicle 10. FIG. 2 is a diagram of the step device 16 as viewed from the left side of the vehicle, and FIG. 3 is a diagram of the step device 16 as viewed from the lower side of the vehicle (that is, the direction of an arrow A illustrated in FIG. 2). FIG. 4 is a diagram illustrating a state in which a step 20 is removed from the step device 16 illustrated in FIG. 3, that is, a diagram illustrating a configuration example of a holder 30 of the step device 16. Note that FIGS. 2 to 4 illustrate a configuration example of the step device 16 provided on the left side portion of the straddle type vehicle 10, and a step device having a similar configuration (specifically, a configuration that is laterally inverted) is provided also on the right side portion of the straddle type vehicle 10. Further, in the present embodiment, a configuration example of the step device 16 for the driver of the straddle type vehicle 10 to put a foot on will be described, but a step device for a passenger to place a foot on can have a similar configuration.

The step device 16 of the present embodiment includes a step 20 that the driver (occupant) puts a foot on, and a holder 30 that rotatably holds (supports) the step 20. The step device 16 is configured as a so-called tiltable step device in which, in a case where the step 20 comes into contact with the ground while the straddle type vehicle 10 is turning (in a bank), the step 20 pivots upward (specifically in a direction of an arrow B in FIG. 2) to release the load.

First, the step 20 will be described. The step 20 is a component protruding in the vehicle width direction (Y direction) from the vehicle body frame 12 so that the driver can place (place) their foot thereon, and includes a main body portion 21 and an attachment portion 22.

The main body portion 21 is a portion on which a driver puts their foot. The main body portion 21 may have a bumpy structure or may be covered with an anti-slip member such as rubber or resin in order to prevent the driver from slipping their foot on the step 20.

The attachment portion 22 is a portion attached to a bracket 31 of the holder 30. In the present embodiment, the attachment portion 22 is provided below the main body portion 21, but may be provided in the main body portion 21 so as to extend along the longitudinal direction of the main body portion 21. The attachment portion 22 is provided with a through hole (not illustrated) that a shaft 40 attached to the bracket 31 of the holder 30 passes through, and is rotatably attached to the bracket 31 of the holder 30 via the shaft 40.

In addition, as illustrated in FIG. 3, the attachment portion 22 is configured to include a facing portion 22*a* (facing surface) facing a base portion 33 (base surface 33*a*) of the bracket 31. The facing portion 22*a* is also a portion that a protruding portion 36 of the holder 30 described later abuts. By bringing the attachment portion 22 (facing portion 22*a*) of the step 20 and the protruding portion 36 of the holder 30 into contact with each other in this manner, the downward rotation of step 20 is restricted, and the posture of the step 20 for the driver to place their foot on is maintained. Here, the step 20 of the present embodiment is urged toward the holder 30 by an urging member 41 such as a spring so that the facing portion 22*a* and the protruding portion 36 of the holder 30 abut each other.

Next, the holder 30 will be described. The holder 30 is a component that rotatably holds the step 20 and is attached to the vehicle body frame 12, and includes the bracket 31 and a stay 35. In the case of the present embodiment, the holder 30 can be manufactured by connecting (bonding, joining) the bracket 31 and the stay 35 separately manufactured, but the bracket 31 and the stay 35 may be manufactured integrally.

The bracket 31 is a component to which the step 20 is attached. In the case of the present embodiment, as illustrated in FIG. 4, the bracket 31 includes two support portions 32 extending so as to sandwich the step 20 (attachment portion 22) and supporting the step 20, and a base portion 33 connecting the two support portions 32. The two support portions 32 are each constituted by a plate-like member in which a through hole 32*a* that the shaft 40 passes through is provided, and support the step 20 via the shaft 40. In addition, the base portion 33 is a plate-like member connecting the two support portions 32. The base portion 33 is disposed such that a surface (base surface 33*a*) on the step 20 side faces the facing portion 22*a* (facing surface) of the step 20 in the posture of the step 20 on which the driver can place their foot. Note that the bracket 31 can be manufactured integrally with the two support portions 32 and the base portion 33 by casting or forging, for example.

The stay 35 is a component connected to the bracket 31 and attached (fixed) to the vehicle body frame 12. As illustrated in FIG. 2, the stay 35 is provided with a through hole 35*a* that a fastening member such as a bolt for fastening the holder 30 (stay 35) and the vehicle body frame 12 passes. In the present embodiment, three through holes 35*a* are provided in the stay 35. To be noted, the stay 35 can be manufactured by, for example, using a sheet metal or casting.

In addition, the stay 35 has a protruding portion 36 that protrudes toward the step 20 from the base portion 33 (base surface) of the bracket 31 and abuts the attachment portion 22 (facing portion 22*a*) of the step 20. In the present embodiment, the protruding portion 36 is provided in the stay 35 so as to be disposed in a cutout portion 33*b* provided in the base portion 33 of the bracket 31. Here, the protruding portion 36 is preferably disposed so as to abut a portion of the attachment portion 22 (facing portion 22*a*) of the step 20 on the front side in the front-and-rear direction (X direction), specifically, a portion more on the front side than the shaft 40 in the front-and-rear direction. Further, the protruding portion 36 is preferably disposed so as to abut a portion of the attachment portion 22 (facing portion 22*a*) of the step 20 on the lower side in the up-and-down direction (Z direction). By arranging the protruding portion 36 in this manner, when the foot of the occupant is placed on the main body portion 21 of the step 20 and a load is applied, the attachment portion 22 of the step 20 can be stably supported by the protruding portion 36.

Configuration of Protruding Portion

Figure 6:
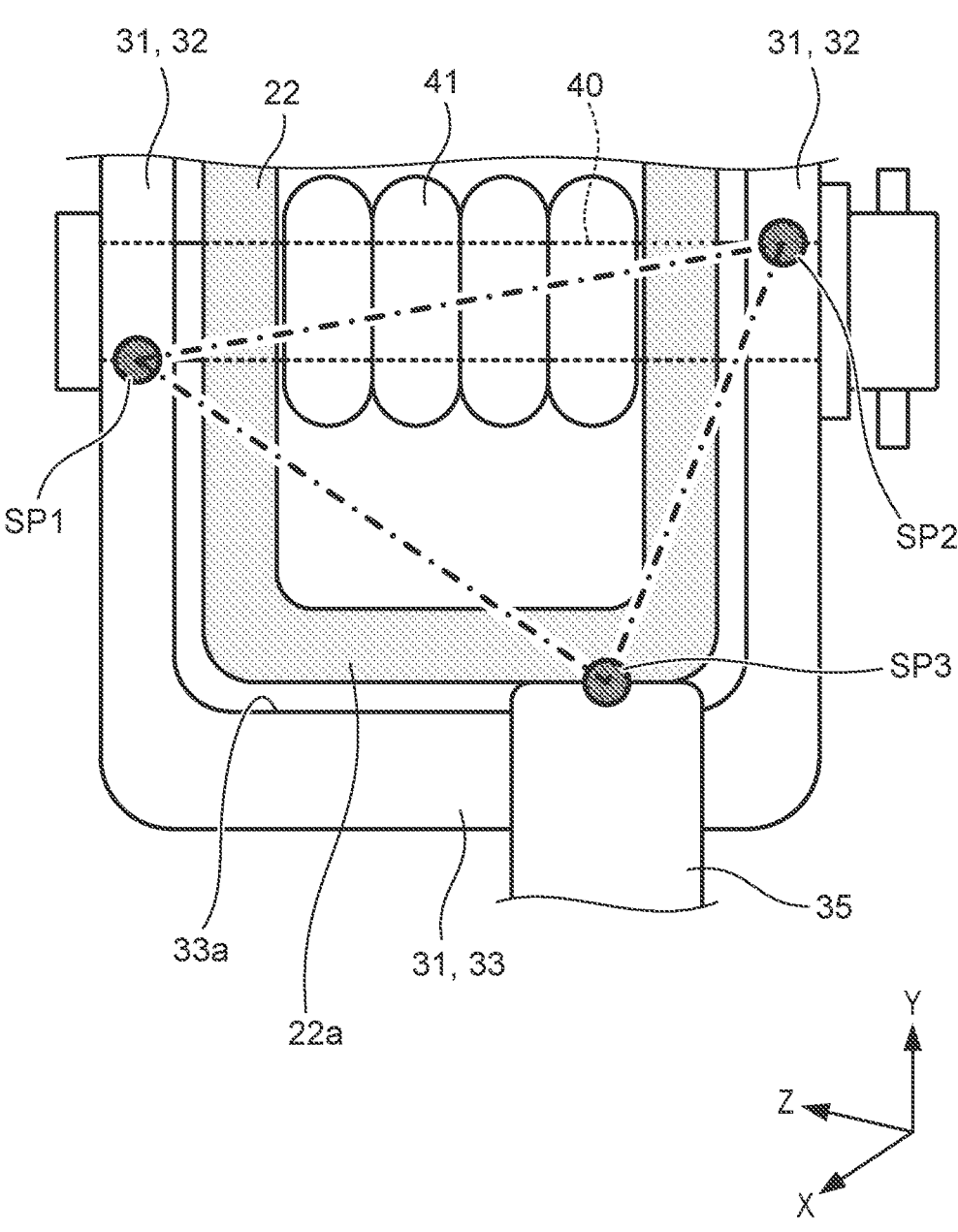
FIG. 6 is a schematic diagram illustrating a positional relationship between a step and the holder in the step device according to the present invention.

Hereinafter, a specific configuration and effect of the protruding portion 36 of the stay 35 will be described with reference to FIGS. 5 and 6. FIG. 5 is an enlarged view of the step device 16 in the vicinity of the base portion 33 of the holder 30 (bracket 31). In FIG. 5, the protruding portion 36 of the holder 30 (stay 35) and the attachment portion 22 of the step 20 are illustrated, and for the sake of clarity of description, a portion hidden by the attachment portion 22 of the step 20 is indicated by a broken line. In addition, FIG. 6 is a schematic diagram illustrating a positional relationship between the step 20 (attachment portion 22) and the holder 30 (bracket 31, protruding portion 36).

In the step device 16 of the present embodiment, as illustrated in FIG. 5, the protruding portion 36 protruding toward the step 20 side more than the base portion 33 (base surface 33a) of the bracket 31 is brought into contact with the attachment portion 22 (facing portion 22a) of the step 20. In a conventional configuration in which the base portion 33 (base surface) of the bracket 31 is brought into contact with the attachment portion 22 of the step 20, the position at which the base portion 33 of the bracket 31 and the attachment portion 22 of the step 20 are brought into contact varies in accordance with vibration, and it is difficult to stably support the step 20 by the holder 30. In contrast, by providing the protruding portion 36 and bringing the protruding portion 36 into contact with the attachment portion 22 of the step 20 as in the present embodiment, the step 20 can be stably supported by the holder 30. As a result, the vibration in the step 20 can be reduced, and how it feels to ride the straddle type vehicle 10 can be improved.

In addition, in the step device 16 of the present embodiment, the stay 35 attached to the vehicle body frame 12 is provided with the protruding portion 36 that abuts the attachment portion 22 (facing portion 22a) of the step 20. For example, when the vibration of the vehicle body frame 12 is transmitted to the bracket 31 via the stay 35, the vibration may be amplified due to the natural frequency, structure, and the like of the bracket 31. Therefore, in the conventional configuration in which the step 20 is supported only by the bracket 31, the vibration amplified by the bracket 31 is transmitted to the step 20, and the vibration in the step 20 can be larger than the vibration of the vehicle body frame 12. In contrast, in the present embodiment, by providing the protruding portion 36 on the stay 35 and bringing the protruding portion 36 into contact with the step 20, the vibration amplified by the bracket 31 and transmitted to the step 20 can be suppressed by the protruding portion 36. That is, the vibration of the step 20 can be reduced, and how it feels to ride the straddle type vehicle 10 can be improved.

Furthermore, as illustrated in FIG. 5, the protruding portion 36 in the step device 16 of the present embodiment is preferably configured such that an area (contact area A2) where the protruding portion 36 and the facing portion 22a of the step 20 are in contact with each other is smaller than an area (facing area A1) where the base portion 33 of the bracket 31 and the facing portion 22a of the step 20 face each other. As a result, as illustrated in FIG. 6, the area of a triangle formed by two support points SP1 and SP2 at which the step 20 is supported by the bracket 31 (two support portions 32) and a support point SP3 at which the step 20 is supported by the protruding portion 36 can be enlarged as compared with the conventional configuration in which the base portion 33 (base surface) of the bracket 31 is brought into contact with the attachment portion 22 of the step 20. The larger the area of the triangle constituted by the support points SP1 to SP3 is, the more stably the step 20 can be supported, which may be advantageous in terms of reducing the vibration of the step 20. It should be noted that the support points SP1 and SP2 may be understood as points at which the load on the step 20 is particularly applied via the shaft 40 in the bracket (two support portions 32), that is, points at which the load is maximized. Similarly, the support point SP3 may be understood as a point at which the load on the step 20 is particularly applied in the protruding portion 36, that is, a point at which the load is maximized.

Here, as the contact area A2 is smaller, the step 20 can be more stably supported by the holder 30, and the vibration of the step 20 can be reduced more. Ideally, the protruding portion 36 and the facing portion 22a of the step 20 are preferably brought into point contact. However, in reality, considering the rigidity and strength of the protruding portion 36, it is difficult to bring the protruding portion 36 and the facing portion 22a of the step 20 into point contact. Therefore, the protruding portion 36 is preferably configured such that the contact area A2 is smaller than a half (preferably ¼, more preferably ⅛) of the facing area A1.

As described above, in the step device 16 of the present embodiment, the protruding portion 36 protruding toward the step 20 side more than the base portion 33 of the bracket 31 and abutting the step 20 (the facing portion 22a of the attachment portion 22) is provided in the holder 30. As a result, since the step 20 can be stably supported by the holder 30, the vibration of the step 20 can be reduced, and how it feels to ride the straddle type vehicle 10 can be improved.

SUMMARY OF EMBODIMENTS

A step device according to a first aspect of the present invention is a step device (16) provided in a straddle type vehicle (10), comprising:

a step (20) for an occupant of the straddle type vehicle (10) to put a foot on; and a holder (30) including a bracket (31) to which the step (20) is attached, wherein the bracket (31) includes two support portions (32) extending to sandwich the step (20) and rotatably supporting the step (20), and a base portion (33) connecting the two support portions (32), and wherein the holder (30) includes a protruding portion (36) protruding toward the step (20) side more than the base portion (33) to abut the step (20).

According to the step device according to the first aspect of the present invention, since the step can be stably supported by the holder, the vibration of the step can be reduced, and how it feels to ride the straddle type vehicle can be improved.

In the step device according to a second aspect of the present invention, the step (20) includes a main body portion (21) that the occupant puts a foot on, and an attachment portion (22) attached to the bracket (31), the attachment portion (22) of the step (20) is configured to include a facing portion (22a) facing the base portion (33), and the protruding portion (36) of the holder (30) abuts the facing portion (22a).

According to the step device according to the second aspect of the present invention, when a foot of the occupant is placed on the main body portion of the step and a load is applied, the protruding portion can stably support the attachment portion of the step.

In the step device according to a third aspect of the present invention, a contact area (A2) where the protruding portion (36) of the holder (30) and the facing portion (22a) of the step (20) abut each other is smaller than a facing area (A1) where the base portion (33) of the holder (30) and the facing portion (22a) of the step (20) face each other.

According to the step device according to the third aspect of the present invention, it is possible to enlarge the area of the triangle formed by the two support points where the step is supported by the bracket (two support members) and the support point where the step is supported by the protruding portion of the holder, which can be advantageous in terms of reducing the vibration of the step.

In the step device according to a fourth aspect of the present invention, the contact area (A2) is smaller than a half of the facing area (A1).

According to the step device according to the fourth aspect of the present invention, the step can be stably supported by the holder, and the vibration of the step can be reduced.

In the step device according to a fifth aspect of the present invention, a cutout portion (33b) is provided in the base portion (33) of the bracket (31), and the protruding portion (36) of the holder (30) is disposed in the cutout portion (33b) of the base portion (33).

According to the step device according to the fifth aspect of the present invention, the protruding portion of the holder can be brought into contact with a desired position (for example, the front side in the front-and-rear direction of the vehicle and/or the lower side in the up-and-down direction of the vehicle) of the step. Therefore, when the occupant's foot is placed on the step and a load is applied, the step can be stably supported by the protruding portion of the holder.

In the step device according to a sixth aspect of the present invention, the holder (30) includes a stay (35) connected to the bracket (31) and fixed to a vehicle body frame (12) of the straddle type vehicle (10), and the protruding portion (36) is configured as part of the stay (35).

According to the step device according to the sixth aspect of the present invention, since the vibration amplified due to the natural frequency, the structure, and the like of the bracket and transmitted to the step can be suppressed by the protruding portion, the vibration of the step can be reduced, and how it feels to ride the straddle type vehicle can be improved.

In the step device according to a seventh aspect of the present invention, the step device (16) further comprises an urging member (41) that urges the step (20) toward the holder (30) such that the step (20) and the protruding portion (36) of the holder (30) abut each other.

According to the step device according to the seventh aspect of the present invention, since the step and the protruding portion of the holder can be reliably brought into contact with each other, the step can be stably supported by the holder, and the vibration of the step can be reduced.

In the step device according to an eighth aspect of the present invention, the two support portions (32) of the bracket (31) have a hole (32a) that a shaft (40) passes through, and support the step (20) via the shaft (40).

According to the step device according to the eighth aspect of the present invention, the step can be rotatably supported by the bracket.

A straddle type vehicle according to one aspect of the present invention comprises the step device (16) according to any one of the above first to eighth aspects.

According to the straddle type vehicle according to one aspect of the present invention, it is possible to reduce the vibration of the step and improve how it feels to ride the vehicle.

The invention is not limited to the foregoing embodiments, and various variations/changes are possible within the spirit of the invention.

What is claimed is:

1. A step device (16) provided in a straddle type vehicle (10), comprising:

a step (20) for an occupant of the straddle type vehicle (10) to put a foot on; and a holder (30) configured by connecting a bracket (31) to which the step (20) is attached, and a stay (35) which is attached to the straddle type vehicle (10), wherein the bracket (31) includes two support portions (32) extending to sandwich the step (20) and rotatably supporting the step (20), and a base portion (33) connecting the two support portions (32), and wherein the base portion (33) is provided with a cutout portion (33b), and wherein the holder (30) is provided with a protruding portion (36) extending from the stay (35) so as to pass through the cutout portion (33b) while being spaced apart from the bracket (31), and protruding toward the step (20) side to abut the step (20).

2. The step device according to claim 1, wherein the step (20) includes a main body portion (21) that the occupant puts a foot on, and an attachment portion (22) attached to the bracket (31), the attachment portion (22) of the step (20) is configured to include a facing portion (22a) facing the base portion (33), and the protruding portion (36) of the holder (30) abuts the facing portion (22a).

3. The step device according to claim 2, wherein a contact area (A2) where the protruding portion (36) of the holder (30) and the facing portion (22a) of the step (20) abut each other is smaller than a facing area (A1) where the base portion (33) of the holder (30) and the facing portion (22a) of the step (20) face each other.

4. The step device according to claim 3, wherein the contact area (A2) is smaller than a half of the facing area (A1).

5. The step device according to claim 1, wherein the protruding portion (36) protrudes toward the step (20) side more than the base portion (33) to abut the step (20).

6. The step device according to claim 1, wherein the stay (35) is connected to the bracket (31) and fixed to a vehicle body frame (12) of the straddle type vehicle (10), and the protruding portion (36) is configured as part of the stay (35).

7. The step device according to claim 1, further comprising an urging member (41) that urges the step (20) toward the holder (30) such that the step (20) and the protruding portion (36) of the holder (30) abut each other.

8. The step device according to claim 1, wherein the two support portions (32) of the bracket (31) have a hole (32a) that a shaft (40) passes through, and support the step (20) via the shaft (40).

9. The step device according to claim 8, wherein the cutout portion (33b) and the protruding portion (36) are arranged to enlarge an area of a triangle which is formed by two support points (SP1, SP2) at which the step (20) is supported by the two support portions (32) of the bracket (31) and a load on the step (20) is applied via the shaft (40), and a support point (SP3) at which the step 20 is supported by the protruding portion (36).

10. A straddle type vehicle comprising the step device (16) according to claim 1.

* * * * *